(12) United States Patent
Weiland et al.

(10) Patent No.: US 6,681,561 B2
(45) Date of Patent: Jan. 27, 2004

(54) OUTLET DEVICE FOR A JET ENGINE

(75) Inventors: Carleric Weiland, Linköping (SE); Hans Berglund, Linköping (SE)

(73) Assignee: SAAB AB, Linköping (SE)

( * ) Notice: Subject to any disclaimer, the term of this patent is extended or adjusted under 35 U.S.C. 154(b) by 27 days.

(21) Appl. No.: 10/149,368

(22) PCT Filed: Dec. 22, 2000

(86) PCT No.: PCT/SE00/02661

§ 371 (c)(1),
(2), (4) Date: Jun. 6, 2002

(87) PCT Pub. No.: WO01/46580

PCT Pub. Date: Jun. 28, 2001

(65) Prior Publication Data

US 2002/0189232 A1 Dec. 19, 2002

(30) Foreign Application Priority Data

Dec. 22, 1999 (SE) ................................. 9904734

(51) Int. Cl.[7] ............................. F02K 1/40; B05B 12/00
(52) U.S. Cl. ...................... 60/230; 60/770; 239/265.25; 239/265.35
(58) Field of Search .............. 60/230, 770; 239/265.25, 239/265.35

(56) References Cited

U.S. PATENT DOCUMENTS 3,570,247 A    3/1971   Denning et al.
4,627,586 A  * 12/1986  Krumins et al. ........... 244/3.21
5,050,803 A  *  9/1991  Wakeman et al. ....... 239/265.35
5,170,964 A  * 12/1992  Enderle et al. ............... 244/52
6,381,950 B1 *  5/2002  Whaites et al. ............... 60/264

FOREIGN PATENT DOCUMENTS

| GB | 677973  | 8/1952 |
| GB | 950288  | 2/1964 |
| GB | 1058933 | 2/1967 |

* cited by examiner

*Primary Examiner*—Charles G. Freay
(74) *Attorney, Agent, or Firm*—Swidler Berlin Shereff Friedman, LLP

(57) ABSTRACT

An outlet device for a jet engine (2) includes an outlet channel (3), which has an upstream end (3') for being connected to the jet engine and a downstream end (3") and which defines a main flow direction (a) for a jet from the jet engine. The outlet channel has in the proximity of the downstream end an elongated shape, seen in a section across the flow direction, and includes at least two outlet portions (4, 5, 6), which are separated from each other, for a respective outlet flow of said jet. A first outlet portion (5, 6) includes means for controlling the outlet direction of the outlet flow in a first plane and a second outlet portion (4) includes means for controlling the outlet direction of the outlet flow in a second plane, which forms an angle to the first plane. An aircraft may include such an outlet device.

19 Claims, 5 Drawing Sheets

OUTLET DEVICE FOR A JET ENGINE

THE BACKGROUND OF THE INVENTION AND PRIOR ART

The present invention refers to an outlet device for a jet engine, including an outlet channel, which defines a main flow direction for a jet from the jet engine, wherein the outlet channel has an upstream end for being connected to the jet engine and a downstream end, wherein the outlet channel in the proximity of the downstream end has an elongated shape, seen in the flow direction, and includes at least two outlet portions, which are separated from each other, for a respective outlet flow of said jet. The invention also refers to an aircraft including a jet engine.

Typical aeroplanes, which are driven by one or several jet engines, beside the forward wings today frequently have a tail portion with a fin and two stabilising wings. On the fin a side rudder is normally provided for the steering of the aeroplane in a lateral direction. On the stabilising wings, or in certain cases on the main wings for instance on so called delta wings, elevators are provided for the steering of the aeroplane in a vertical direction. Such a tail portion involves a complicated design work for obtaining the desired aerodynamic properties and manoeuvring possibilities of the aeroplane. It is in certain cases desired to have a tail portion which has a more simple design. Furthermore, the manoeuvring possibilities which may be obtained by such conventional rudders may be experienced to be insufficient, in particular if the aeroplane is propelled at a low speed.

By jet engine it is, in the present application, referred to all available jet engines, such as turbo jet engines, double jet engines, turbo fan engines, ram-jet engines, pulse-jet engines, rocket engines etc.

U.S. Pat. No. 3,570,247 discloses an outlet nozzle for a jet engine. The outlet nozzle includes two outlet portions, which are provided beside each other. Each outlet portion includes guide flaps for controlling the flow in a vertical plane.

SUMMARY OF THE INVENTION

The object of the present invention is to provide an alternative design of an outlet device of an aircraft with a jet engine. In particular, it is aimed at an outlet device which permits appropriate manoeuvring possibilities of the aircraft and a more simple design of the tail portion of the aircraft.

This object is obtained by the outlet device initially defined, which is characterised in that at least a first of said outlet portions includes means for controlling the outlet direction of the outlet flow in a first plane and that at least a second of said outlet portions includes means for controlling the outlet direction of the outlet flow in a second plane, which forms an angle to the first plane.

By designing the outlet with two separate outlet portions, it is possible to obtain a jet which has a stabilising effect on the flying of an aircraft. Depending on the direction of the outlet flows from both the outlet portions a certain tipping moment and rolling moment may be obtained. By such an outlet device, it is thus possible to replace the corresponding dynamic rudders of a conventional aeroplane and in such a way obtain a simplified aeroplane design. It is possible, by means of the outlet flows, to provide determined moving moments of an aeroplane, for instance yaw moment, tipping moment or rolling moment. Thereby, said control means of said outlet portions may function as the elevator of the aeroplane and thus steering the aeroplane in a vertical direction, and as the side rudder of the aeroplane and thus steering the aeroplane in a horizontal direction. By directing one of the outlet flows obliquely upwardly and the other outlet flow obliquely downwardly, a rolling moment may be obtained, for instance. Except for the fact that such an outlet device gives the tail portion of the aeroplane a simplified design, a very good authority of the steering is obtained by such a control, i e the aeroplane will respond very well to changes in the direction of the outlet flows. Furthermore, such a control in a vertical direction is very useful when an aeroplane is propelled at relatively low speeds.

According to a further advantageous embodiment of the invention, said control means of said first outlet portion are arranged to control the outlet flow concerned independent of said control means of said second outlet portion. In such a way it is possible to direct the flow from each of the outlet portions in a respective desired direction for providing a substantially arbitrary moving moment of the aeroplane.

According to a further embodiment of the invention, said outlet portions are provided beside each other seen in said section. Thereby, a wall portion may be provided between two adjacent ones of said outlet portions in order to separate the different outlet flows from each other.

According to a further advantageous embodiment of the invention, said outlet portions include a central outlet portion and two lateral outlet portions, one at each side of the central outlet portion. Thereby, said control means of the lateral outlet portions may advantageously be arranged to control the outlet flow concerned in the first plane, and said control means of the central outlet portion may be arranged to control the outlet flow concerned in the second plane. In such a way one may steer an aeroplane in a vertical direction by means of the lateral outlet portion, and in a lateral direction by means of the central outlet portion. In such a way, both the stabilising wings with the elevators and the fin with the rudder on a conventional aeroplane may be replaced by the outlet device according to the invention.

According to a further embodiment of the invention, a said control means includes at least one guide flap of each outlet portion. Said guide flap is preferably rotatable about an axis, which extends substantially across the flow direction. Advantageously, said control means may include at least two guide flaps of each outlet portion, wherein the rotary axis of one of the guide flaps extends substantially in parallel with the rotary axis of the other guide flap. The two guide flaps may be provided at a distance from each other and arranged to enclose the outlet flow concerned between each other. In such a way one may in an efficient manner control the outlet flow in a desired direction which may form an angle with the flow direction. Said outlet portion may also include at least a third guide flap, which is provided between the two guide flaps and which is rotatable about a rotary axis, which extends substantially in parallel with the rotary axis of the two guide flaps.

The object is also obtained by an aircraft, which includes a jet engine and an outlet device as described above. Thereby, the outlet device may advantageously be provided at a tail portion of the aircraft. It is also possible to provide the outlet device downstream of a jet engine, which is mounted beneath a wing of the aircraft. The aircraft may form an aeroplane, a rocket or a missile.

BRIEF DESCRIPTION OF THE DRAWINGS

The present invention is now to be explained more closely by a description of different embodiments and with reference to the drawings attached.

DETAILED DESCRIPTION OF DIFFERENT EMBODIMENTS OF THE INVENTION

Figure 1:
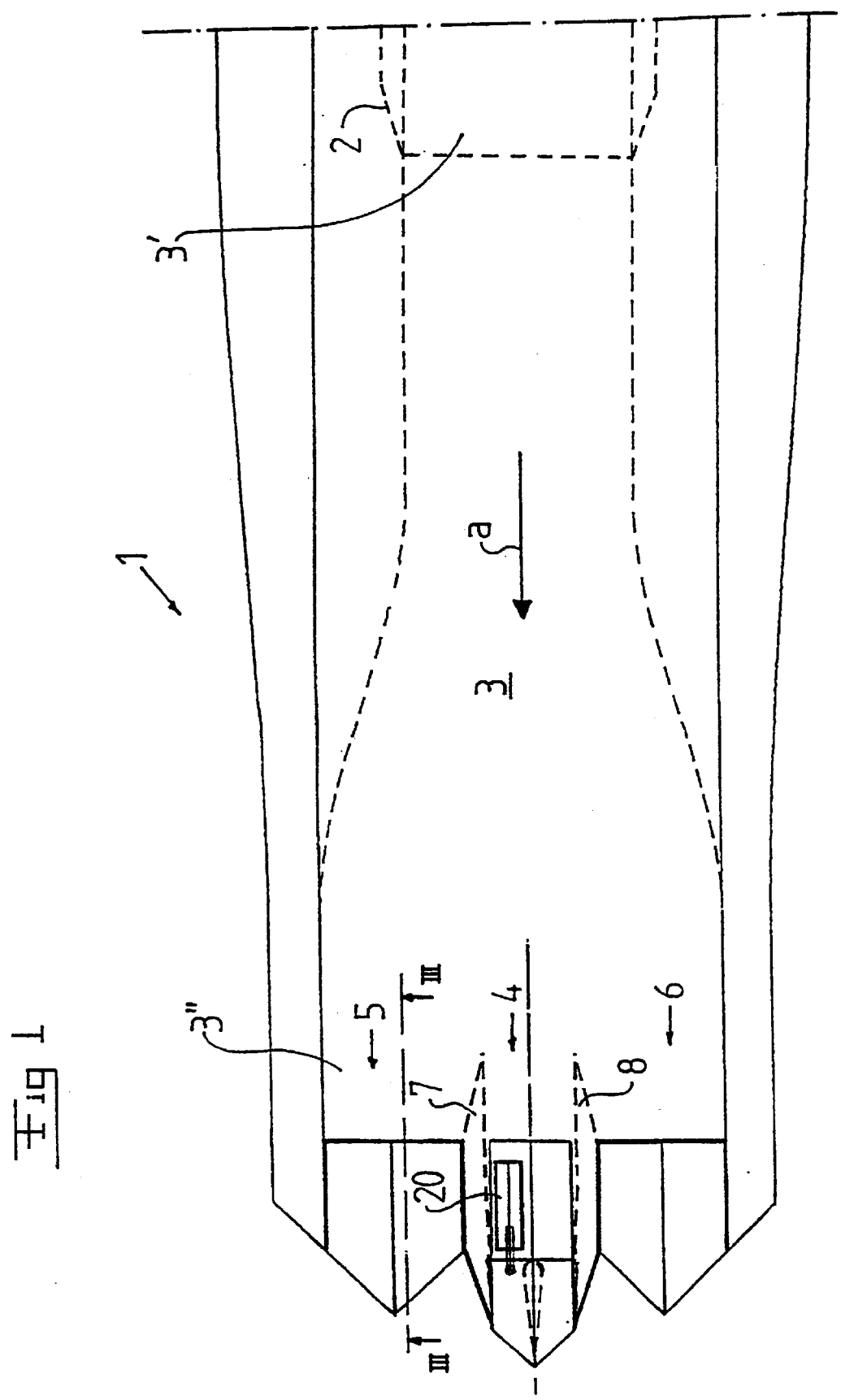
FIG. 1 discloses a view from above of a tail portion of an aircraft with an outlet device according to a first embodiment of the invention.
Figure 2:
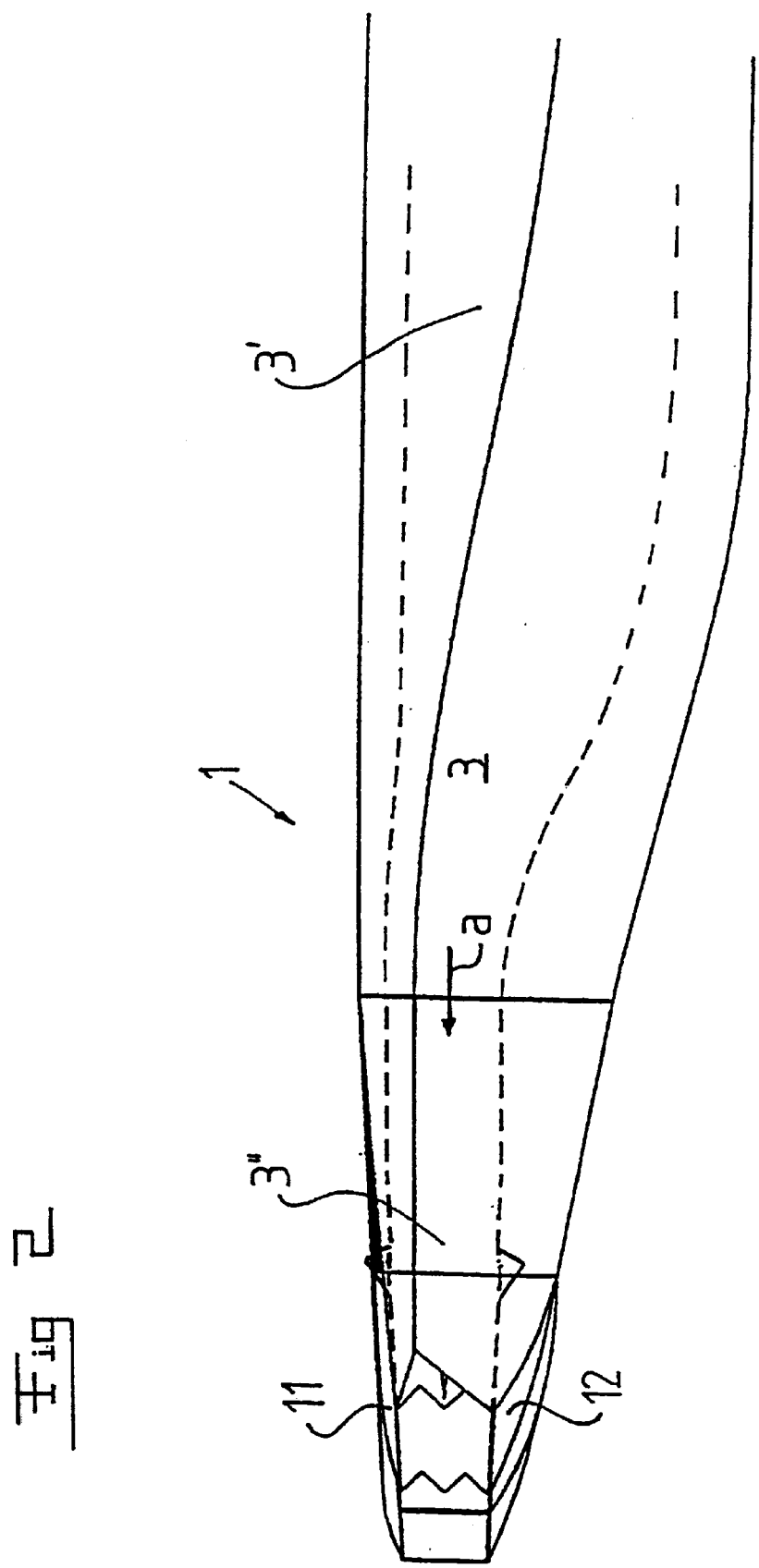
FIG. 2 discloses a side view of the outlet device.

FIGS. 1 and 2 disclose a tail portion of an aircraft 1. The aircraft 1 includes a partly indicated jet engine 2, which is arranged to produce a jet for the propelling of the aircraft 1. The jet engine 2 connects to an outlet channel 3, which has an upstream end 3' in the proximity of the jet engine 2 and a downstream end 3", the outlet channel 3 defines a main flow direction a for the jet. The upstream end 3' of the outlet channel 3, which connects to the jet engine 2, preferably has a substantially circular shape, seen in a section across the flow direction a. At the downstream end 3", the outlet channel 3 has an elongated shape seen in a section across the flow direction a.

At the downstream end 3", the outlet channel 3 is divided into three outlet portions lying beside each other, and more exactly a central outlet portion 4 and two lateral outlet portions 5, 6, which are arranged at a respective side of the central outlet portion 4. The outlet portions 4–6 are separated from each other by means of two wall portions 7 and 8, which extend in the flow direction a and substantially vertically in a normal operation position of the aircraft 1. The wall portions 7 and 8 have an aerodynamic design and thus permit a splitting of the jet in three separate outlet flows.

Each of the outlet portions 4–6 disclosed includes means for controlling the outlet direction of the respective outlet flow. However, it is to be noted that such control means does not necessarily need to be provided for the central outlet portion 4, but this outlet portion 4 may be arranged to convey its outlet substantially straight rearwardly in the main flow direction a in all operation positions.

Figure 3:
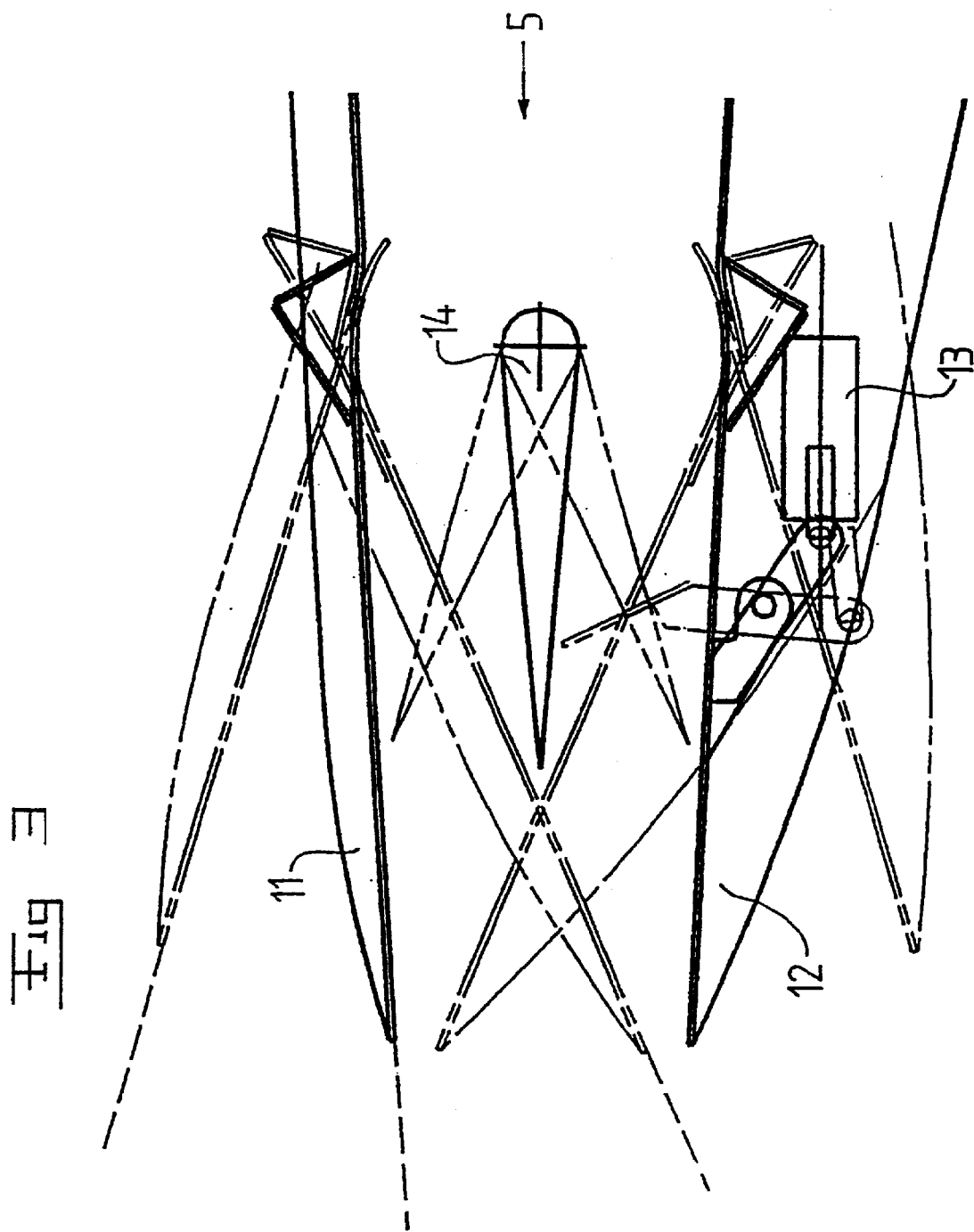
FIG. 3 discloses a section along the line III—III in FIG. 1.
Figure 4:
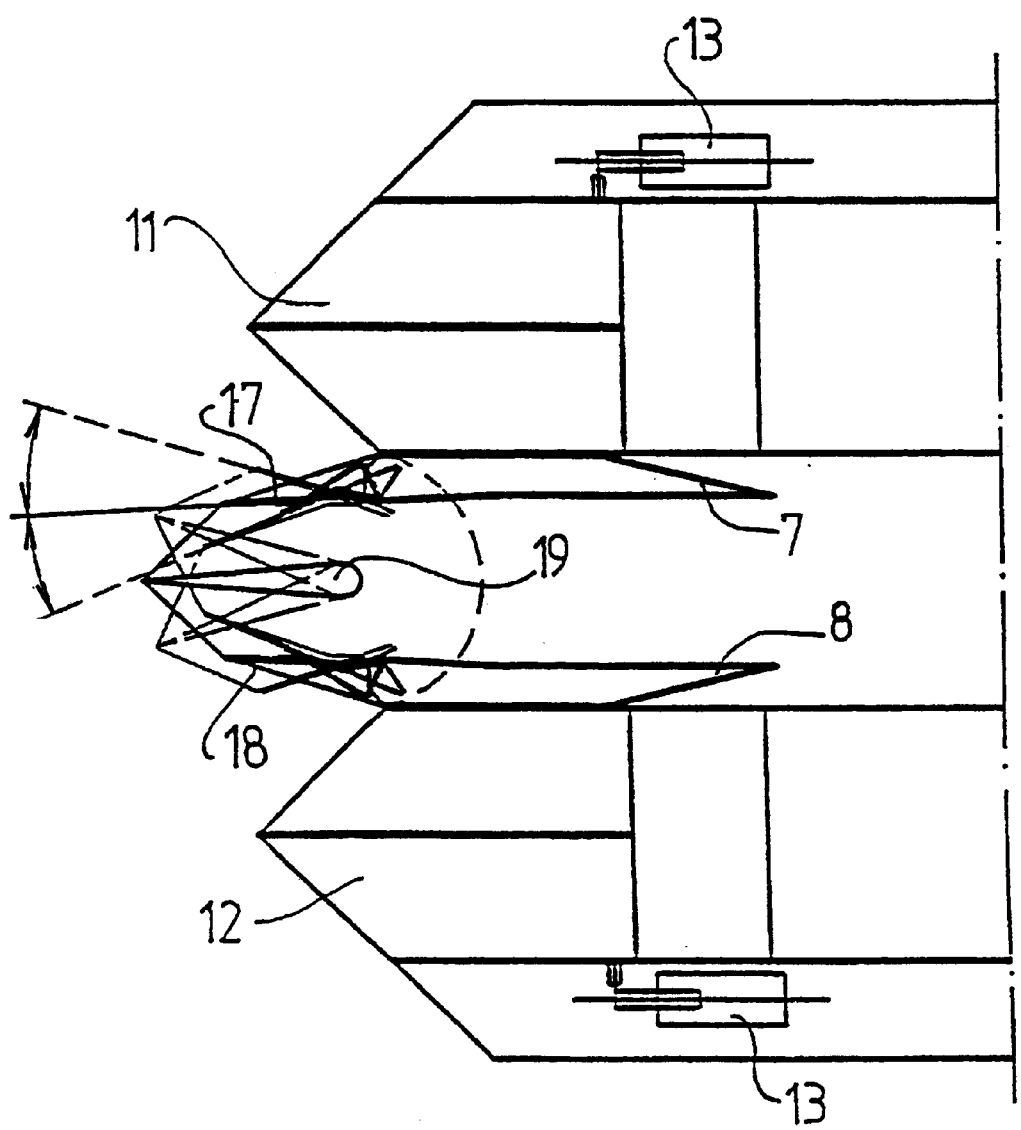
FIG. 4 discloses a partly sectional view of the outlet device.

In the embodiment disclosed, said control means of the lateral outlet portions 5 and 6 include two guide flaps 11 and 12, which are rotatable about a rotary axis extending substantially perpendicularly to the main flow direction a and substantially horizontally in said normal operation position, see also FIG. 3. Each guide flap 11 and 12 includes a guiding surface, which forms a limiting wall for the outlet flow in the respective outlet portion 5 and 6. In a normal position, the two guide, flaps 11 and 12 extend in such a way that said guiding surfaces are substantially parallel to each other. However, it is to be noted that the guiding surfaces also may converge somewhat in the main flow direction a, as is indicated in FIG. 3, or diverge somewhat. As further appears from FIG. 3, the guide flaps 11 and 12 may rotate about their respective rotary axis upwardly and downwardly. If the guide flaps 11, 12 are rotated upwardly, the outlet flow will be directed obliquely upwardly in relation to the main flow direction a, and if the guide flaps 11 and 12 are rotated downwardly, the outlet flow will be directed obliquely downwardly in relation to the main flow direction a. Consequently, the guide flaps 11 and 12 may function as elevators for the aircraft 1. FIG. 3 indicates schematically an adjustment member 13 in the form of a hydraulic cylinder for the adjustment of the rotary position of the guide flaps 11 and 12. Furthermore, the two lateral outlet portions 5 and 6 may include at least an intermediate guide flap 14, which is provided substantially exactly in the middle between the two guide flaps 11 and 12 and which is rotatable about a rotary axis extending in parallel with the rotary axis of the two guide flaps 11 and 12. By means of the intermediate guide flap 14, the directing effect of the outlet flow is further improved.

The guide flaps 11, 12 and 14 have a substantially identical design for the two lateral outlet portions 5 and 6. However, the guide flaps 11, 12 and 14 of one of the lateral outlet portion 5 are controllable in an individual manner in relation to the guide flaps 11, 12 and 14 of the other lateral outlet portion 6. Thus, the outlet flow from one of the lateral outlet portions 5 may for instance be directed obliquely upwardly whereas the outlet flow from the other lateral outlet portion may be directed obliquely downwardly. Since the two lateral outlet portions 5 and 6 are symmetrically positioned at a respective side of the longitudinal centre axis x of the aircraft 1, the aircraft 1 may thus be given a rolling moment by directing the guide flaps 11, 12 and 14 in a suitable manner.

Also the central outlet portion 4 includes guide flaps 17 and 18 having a guiding surface which forms a limiting wall of the central outlet portion 4. The guide flaps 17 and 18 are rotatable about a respective rotary axis which extends in parallel to each other, across the flow direction a and substantially horizontally in said normal operation position. The rotary axes of the guide flaps 17, 18 are thus substantially perpendicular in relation to the rotary axes of the guide flaps 11, 12 and 14. Also the central outlet portion 4 may include at least one intermediate guide flap 19, which is rotatable about a rotary axis, which extends in parallel with the rotary axes of the guide flaps 17 and 18. FIG. 1 indicates schematically an adjustment member 20 in the form of a hydraulic cylinder for the adjustment of the rotary angle of the guide flaps 17, 18 and 19. By means of the guide flaps 17, 18 and 19 the outlet flow from the central outlet portion 4 may thus be directed straight rearwardly, to the left or to the right, and in such a way the aircraft may be given a yaw moment to the right or to the left. The guide flaps 17, 18 and 19 of the central outlet portion 4 may thus replace the conventional rudder of the aircraft.

Figure 5:
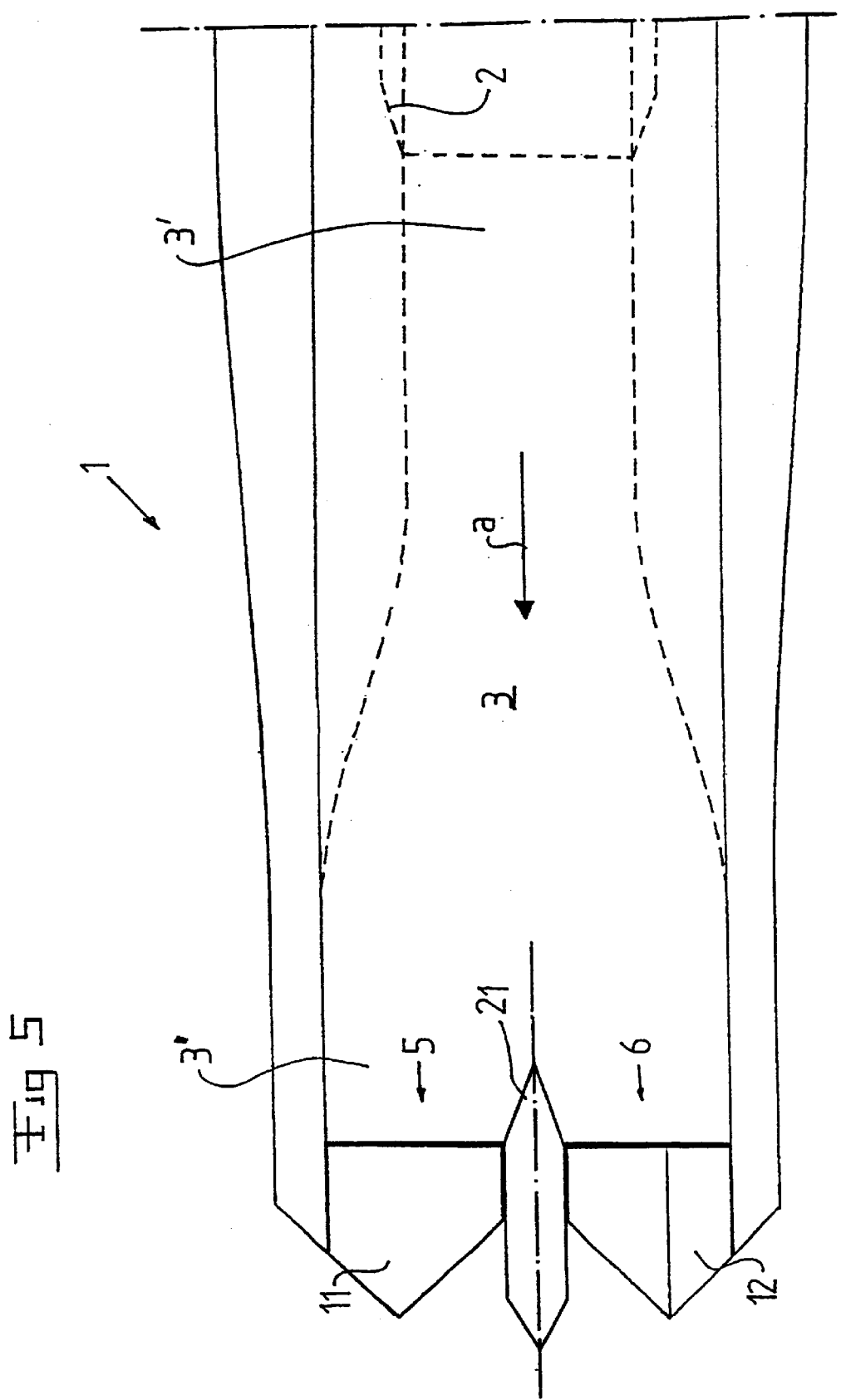
FIG. 5 discloses a tail portion of an aircraft with an outlet device according to a second embodiment of the invention.

FIG. 5 discloses another embodiment of the invention, which differs from the first embodiment by the excision of the central outlet portion 4. Such an aircraft 1 may instead include a normal fin with a rudder, wherein the guiding of the aircraft 1 in a vertical direction and the roll possibilities are regulated by the two lateral outlet portions 5 and 6, which are separated from each other by a wall portion 21.

The invention is not limited to the embodiments disclosed but may be varied and modified within the scope of the following claims.

What is claimed is:

1. An outlet device for a jet engine (2), including an outlet channel (3), which defines a main flow direction (a) for a jet (2) from the jet engine, wherein the outlet channel (3) has an upstream end (3') for being connected to the jet engine and a downstream end (3"), wherein the outlet channel (3) in the proximity of the downstream end (3") has an elongated shape, seen in a section across the flow direction (a), and includes at least two outlet portions (4–6), which are separated from each other, for a respective outlet flow of said jet, characterised in that said outlet portions (4, 5, 6) include a central outlet portion (4) and two lateral outlet portions (5, 6), one at each side of the central outlet portion (4), wherein said lateral outlet portions (5, 6) include means (11, 12, 14)

for controlling the outlet direction of the outlet flow in a first plane and said central outlet portion (4) includes means (17–19) for controlling the outlet direction of the outlet flow in a second plane, which forms an angle to the first plane.

2. An outlet device according to claim 1, characterised in that said angle is substantially perpendicular.

3. An outlet device according to claim 2, characterised in that said first plane is intended to extend substantially vertically in a normal operation position.

4. An outlet device according to claim 3, characterised in that said control means (11, 12, 14, 17, 18, 19) of said first outlet portion (4, 5, 6) are arranged to control the outlet flow concerned independent of said control means (11, 12, 14, 17, 18, 19) of said second outlet portion (4, 5, 6).

5. An outlet device according to claim 1, characterised in that said outlet portions (4, 5, 6) are arranged beside each other seen in said section.

6. An outlet device according to claim 5, characterised in that a wall portion (7, 8) is provided between two adjacent ones of said outlet portions (4, 5, 6).

7. An outlet device according to claim 1, characterised in that said control means (11, 12, 14) of the lateral outlet portions (5, 6) are arranged to control the outlet flow concerned in the first plane and that said control means (17, 18, 19) of the central outlet portion (4) are arranged to control the outlet flow concerned in the second plane.

8. An outlet device according to claim 1, characterized in that said control means includes at least one guide flap of each outlet portion (4, 5, 6).

9. An outlet device according to claim 8, characterised in that said guide flap is rotatable about an axis extending substantially across the flow direction (a).

10. An outlet device according to claim 9, characterised in that said control means includes at least two guide flaps (11, 12; 17, 18) of each outlet portion (4, 5, 6), wherein the rotary axis of one of the guide flaps (11; 17) extends substantially in parallel to the rotary axis of the other guide flap (12; 18).

11. An outlet device according to claim 10, characterised in that the two guide flaps (11, 12; 17, 18) are provided at a distance from each other and arranged to enclose the outlet flow concerned between each other.

12. An outlet device according to claim 11, characterised in that said outlet portion (4, 5, 6) includes at least one third intermediate guide flap (14, 19), which is provided between the two guide flaps (11, 12; 17, 18) and rotatable about a rotary axis extending substantially in parallel with the rotary axis of the two guide flaps (11, 12; 17, 18).

13. An outlet device according to claim 1, characterised in that the outlet channel (3) in the proximity of the upstream end (3') has a substantially circular shape, seen in a section across the flow direction (a).

14. An aircraft including at least one jet engine, characterised by an outlet device according to claim 1.

15. An aircraft according to claim 14, characterised in that the outlet device is provided at a tail portion of the aircraft.

16. An aircraft according to claim 14, characterised in that the outlet device is provided in the proximity of a wing of the aircraft.

17. An aircraft according to claim 14, which forms an aeroplane.

18. An aircraft according to claim 14, which forms a rocket.

19. An aircraft according to claim 14, which forms a missile.

* * * * *